May 12, 1970     A. V. LJUTOV     3,511,253
DEVICE FOR PROTECTING WATER CONDUITS FROM FREEZING
Filed June 8, 1965
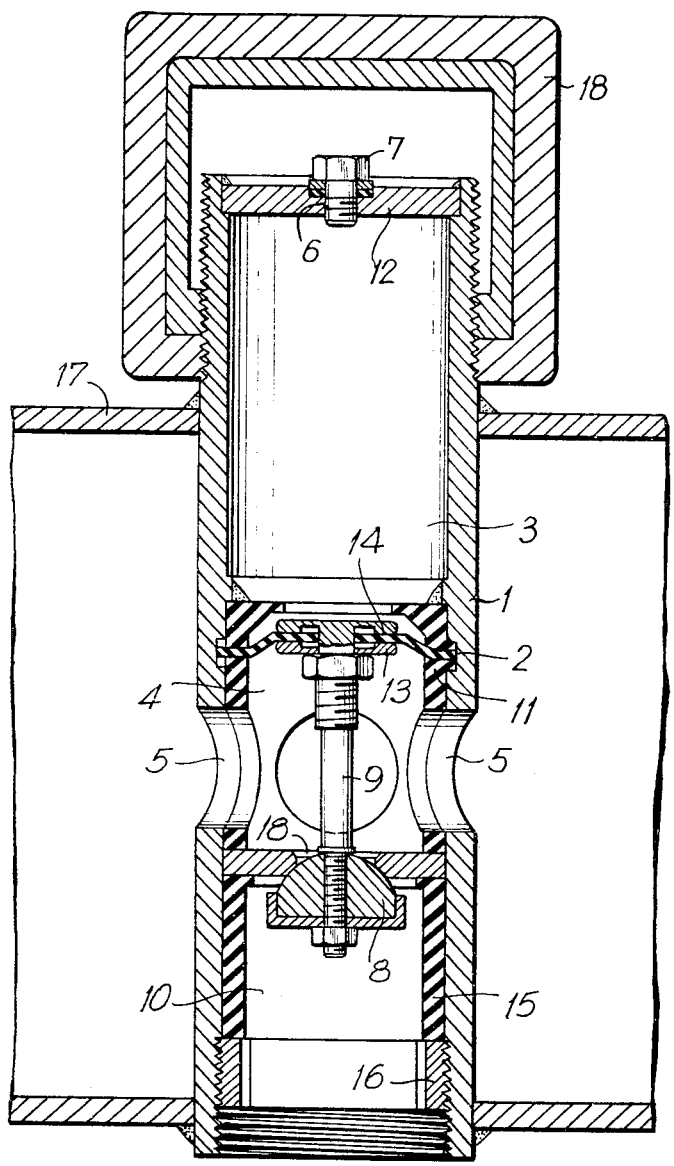

United States Patent Office 3,511,253
Patented May 12, 1970

3,511,253
DEVICE FOR PROTECTING WATER CONDUITS FROM FREEZING
Anatoly Vasilievich Ljutov, Norilsk, U.S.S.R., assignor to Norilsky Goronometallurgichesky Kombinat imeni A.R. Zavenjagina, Norilsk, U.S.S.R.
Filed June 8, 1965, Ser. No. 462,229
Int. Cl. E03b 7/00
U.S. Cl. 137—60                                    4 Claims

ABSTRACT OF THE DISCLOSURE

A branch pipe installed in a conduit and including a portion projecting from the conduit exposed to atmospheric air, the branch pipe having lateral openings for the passage of water, and a closed chamber filled with water at least in part in the projecting portion. An outlet valve is provided in the branch pipe for controlling the passage of water externally of the pipe, and a diaphragm is coupled to the valve and subjected to the pressure of the water in the chamber and the pressure of the water passing through the branch pipe such that normally the valve is closed when the water in the closed chamber is in liquid state and is opened when the water in the closed chamber freezes and turns to ice.

---

The present invention relates to devices employed to protect water conduits from freezing by draining the water from them.

Currently known are devices of similar purpose installed inside water conduits and comprising a closed water-filled chamber sensitive to temperature changes in the conduit and and an outlet valve which, as pressure in the closed chamber increases, is opened by means of a system of levers to force the water out of the conduit. A temperature rise is experienced due to the discharge of cooled water replaced by an inflow of warmer water from part of the conduit and a certain increase in the speed of water running in the conduit.

The disadvantages of said devices are their complexity of design and insufficient serviceability.

An object of the invention is to provide a simple and serviceable device to preclude freezing of conduits by automatic discharge of water whenever the temperature thereof drops to zero or approximately zero.

The device of the invention utilizes the volume expansion of freezing water.

In the accomplishment of the above-mentioned and other objects the device of the invention consists of a branch pipe with openings for the passage of water, said branch pipe housing a closed chamber and an outlet valve so arranged inside the conduit as to have the walls of the closed chamber partially exposed to the outside air. In the preferred embodiment of the invention the closed chamber and the valve are separated by a diaphragm which transmits pressure from the closed chamber to the outlet valve.

To control the extent to which the extending part of the chamber is exposed to the outside air, said extending part is enclosed in a heat-insulating casing.

A detailed description of the invention is given hereinbelow, reference being made to the sole figure of the accompanying drawing wherein the device of the invention installed in the water conduit is shown in vertical section.

The device of the invention consists of branch pipe 1 divided by diaphragm 2 into two chambers, viz. upper closed chamber 3 and lower chamber 4 with openings 5. The latter openings serve to let water through the lower chamber from the water conduit.

Chamber 3 is filled with water through opening 6 and then is hermetically closed with plug 7.

Inside branch pipe 1, an outlet valve 8 is installed, which valve is connected with diaphragm 2 by means of rod 9. The branch pipe has a hollow portion 10 lying below valve 8 exposed to atmospheric air. Diaphragm 2 with valve 8 is mounted in a sleeve 11 which is set in branch pipe 1.

The sleeve is closed on top by cap 12. Inside the sleeve the diaphragm is additionally pressed between discs 13 and 14. Packing of sleeve 11 from below is attained by means of sleeve 15 and threaded ring 16.

The branch pipe is installed in conduit 16 so that one part of the closed chamber is disposed in the conduit and receives heat from the water running in the conduit while its other part projects externally and is exposed to atmospheric air.

The projecting part is covered with a heat-insulating casing 18 which is threaded on the projecting part. The casing controls the extent to which the projected part is exposed to the outside air.

When the temperature in the water conduit is above freezing, the temperature of the water in chamber 3 is regulated by the position of casing 18 to be somewhat lower than that of the water running in the conduit. In this case, diaphragm 2, owing to water pressure in the conduit, is displaced upwards and valve 8 tightly shuts outlet 18. If the temperature of the water drops to a value in which the water in chamber 3 turns to ice, an increase of pressure is produced in chamber 3, causing the diaphragm to lower, thereby opening the outlet valve 8 by means of rod 9. The discharge of water then commences until the water temperature in the conduit rises, due to its intensified inflow, to the point of melting the ice in chamber 3, whereby diaphragm 2 again moves upwards to shut valve 8.

The greater heat losses in the conduit, the longer the valve is open and the longer is its service life.

By controlling the extent to which the projecting part of the branch pipe is shut by casing 17, the device can be installed in water conduits having various heat losses.

I claim:

1. A device for protecting a water conduit from freezing by draining water from the conduit, said device comprising a branch pipe adapted for being installed in a conduit and including a portion projecting from the conduit and exposed to atmospheric air, said branch pipe having lateral openings communicating with the interior of the conduit for the passage of water, said branch pipe having a closed chamber filled with water, said closed chamber being at least in part in said projecting portion and in heat transfer relationship with the water in the conduit, said branch pipe having an outlet opening in communication with the lateral openings for outflow of water from said branch pipe, and externally of the conduit, an outlet valve in said branch pipe for controlling the passage of water through said outlet opening externally of the pipe, a diaphragm in said branch pipe coupled to the valve and subjected to the pressure of the water in said chamber and to the pressure of the water in said conduit, differential pressure on said diaphragm normally urging the valve to a closed position with the water in the closed chamber in liquid state, and urging the valve to open position when the water in said closed chamber freezes and turns to ice.

2. A device as claimed in claim 1 comprising a heat insulating casing adjustably supported on the projecting portion of the branch pipe for covering a desired portion of the length thereof.

3. A device as claimed in claim 2 comprising thread means joining the casing and the projecting position of the branch pipe.

4. A device for protecting a water conduit from freezing, said device comprising valve means in said conduit for controlling passage of water from said conduit, and means coupled to the valve means for operating the same to selectively pass water from the conduit, the latter means defining a first chamber which is closed and contains water and is subjected to exposure to the outside atmosphere and is in heat transfer relation with the water in the conduit and defining a second chamber in constant registry with the interior of said conduit upstream from said valve means, and said first and second chambers defined in part by diaphragm means coupled to said valve means and subjected to the pressure of the water in both chambers for operating the valve means in response to the difference in said pressure.

References Cited

UNITED STATES PATENTS

| | | | |
|---|---|---|---|
| 3,320,965 | 5/1967 | Morgan | 137—62 |
| 3,380,464 | 4/1968 | Arterbury et al. | 137—60 |
| 1,526,718 | 2/1925 | Opp | 137—60 X |
| 2,657,092 | 10/1953 | Jones | 239—551 |

FOREIGN PATENTS

| | | |
|---|---|---|
| 372,965 | 1923 | Germany. |
| 522,648 | 1931 | Germany. |

WILLIAM F. O'DEA, Primary Examiner

R. GERARD, Assistant Examiner

U.S. Cl. X.R.

73—368.3